United States Patent [19]
Ohkubo et al.

[11] Patent Number: 5,798,993
[45] Date of Patent: Aug. 25, 1998

[54] SYSTEM AND METHOD FOR SIMULTANEOUSLY VERIFYING OPTICAL DATA WRITING AND OPTICAL DATA WRITING MEDIUM FOR USE THEREIN

[75] Inventors: Shuichi Ohkubo; Mitsuya Okada; Masaki Itou, all of Tokyo, Japan

[73] Assignee: NEC Corporation, Japan

[21] Appl. No.: 651,301

[22] Filed: May 22, 1996

[30] Foreign Application Priority Data

May 29, 1995 [JP] Japan ................. 7-130215
Sep. 6, 1995 [JP] Japan ................. 7-229321

[51] Int. Cl.$^6$ ........................................ G11B 7/00
[52] U.S. Cl. ................. 369/54; 369/58; 369/59; 369/116
[58] Field of Search ................. 369/116, 54, 58, 369/47, 48, 49, 50, 59, 53

[56] References Cited

U.S. PATENT DOCUMENTS

| | | | |
|---|---|---|---|
| 4,680,594 | 7/1987 | Bracht | 346/108 |
| 5,517,471 | 5/1996 | Ashinuma et al. | 369/54 X |
| 5,627,813 | 5/1997 | Miyashita | 369/116 |
| 5,646,924 | 7/1997 | Nonoyama et al. | 369/116 X |

FOREIGN PATENT DOCUMENTS

| | | |
|---|---|---|
| 0729136 | 8/1996 | European Pat. Off. . |
| 55-89919 | 7/1980 | Japan . |
| 57-92438 | 6/1982 | Japan . |
| 60-145537 | 8/1985 | Japan . |
| 2-9024 | 1/1990 | Japan . |
| 3-41632 | 2/1991 | Japan . |
| 3-207040 | 9/1991 | Japan . |
| 5-144112 | 6/1993 | Japan . |

*Primary Examiner*—Muhammad N. Edun
*Attorney, Agent, or Firm*—Hayes, Soloway, Hennessey, Grossman & Hage, P.C.

[57] ABSTRACT

The optical disk writing system disclosed is one in which data written on an optical data writing medium is verified essentially simultaneously with writing on the medium. The written data is verified by detecting a timing of the light irradiated on the medium and by measuring return light doses at rise and fall of the light irradiated on the medium and comparing the doses thereof with predetermined reference values. The medium uses a phase transition reversible between a crystal state and an amorphous state for writing/reading/erasing of data on a data writing film, and includes a first protective film, a phase transition type data writing film, a second protective film, and a reflection film, formed in this order, on a transparent substrate. The thickness of the first protective film is set such that, of three reflectivities of the data writing film respectively in crystal, amorphous and melted states, the reflectivity in the crystal state and the reflectivity in the melted state are made different from each other, and the reflectivity in the amorphous state and the reflectivity in the melted state are made different from each other. A high speed writing operation can be carried out and an overwrite operation can be completed in one disk rotation time.

15 Claims, 9 Drawing Sheets

1

SYSTEM AND METHOD FOR SIMULTANEOUSLY VERIFYING OPTICAL DATA WRITING AND OPTICAL DATA WRITING MEDIUM FOR USE THEREIN

BACKGROUND OF THE INVENTION

(1) Field of the Invention

The present invention relates to an optical disk writing system and method for writing, with which writing and reading of data is made by utilizing a phase transition optical disk. More particularly, the invention relates to a system and method for simultaneously verifying data written on an optical data writing medium, with which the data in high density is written, read and erased by using light. The invention also relates to an optical data writing medium in which there are changes in structures and optical characteristics between a crystal state and an amorphous state depending on differences in temperature rise due to light irradiation and thermal hysteresis due to temperature fall. Thus, the invention relates to a phase transition optical disk and simultaneous writing verifying method.

(2) Description of the Related Art

In one prior art optical disk writing system and writing method, data is written on an optical disk by irradiating the disk with a laser beam. When writing data into the optical disk, it is necessary to verify whether the data being written has correctly been written on the optical disk. Generally, this verification is made by reading the written area after completion of the writing.

In the above prior art, a plurality of beam spots are formed. For the formation of the beam spots, diffraction grating is used as disclosed in Japanese Patent Application Kokai Publication No. Hei 2-9024 or Japanese Patent Application Kokai Publication No. Hei 3-41632, or a plurality of light sources are used. The verification is made using one or two of these beam spots.

With respect to a magneto-optical disk, there is a proposal disclosed in Japanese Patent Application Kokai Publication No. Hei 5-144112 in which a single beam verification using a single beam spot is realized by utilizing characteristics inherent to a magneto-optical disk.

However, in the prior art verification methods applied to the optical disk systems described above, there have been problems in that, when verification is made after the writing operation, the time required for the writing is long and, when a plurality of beam spots are used, there have been problems in that cost is high and adjustment of the optical system is difficult.

An optical disk writing system using laser light makes it possible to perform large volume data writing and non-contact high speed access, and thus practical use thereof as large volume memory is increasing. Optical disks are grouped into dedicated reading type such as compact and laser disks, write once read many type in which a user can carry out writing, and rewritable type in which a user can write and erase repeatedly. The write once read many type disk and the rewritable type disk are used as external memories of computers or document/image files.

The rewritable type disk includes the phase transition type optical disk which utilizes a phase transition of a writing film and the magneto-optical disk which utilizes a magnetization direction transition of a vertical magnetic film. Of these, the phase transition type optical disk does not require an external magnetic field and, moreover, since overwriting can be made easily, the optical disk of this type is expected to become a leading type of rewritable type of optical disk.

A conventional rewritable type optical disk, i.e., a phase transition type optical disk utilizing a writing film in which the transition is caused to occur between a crystal state and an amorphous state by the laser light irradiation exists. In the phase transition type optical disk, writing is accomplished by irradiating on the writing film on a high power laser spot corresponding to the data to be written and locally raising writing film temperature thereby causing crystal/amorphous transition to occur, and reading is accomplished, using low power laser light, by reading changes in the resulting optical constant as an intensity difference of the reflected light or phase transition. For example, in the phase transition optical disk utilizing a writing film in which the crystallization time is comparatively slow, writing is accomplished by rotating the disk, irradiating the laser light on the writing film formed on the disk, raising the temperature of the writing film to above the melting point and, after the laser light has passed, rapidly cooling the writing film so as to change it into an amorphous state. During erasing, writing film temperature is held for a time sufficient to allow crystallization under a crystallization permitting temperature range which is above the crystallization temperature and below the melting point, whereby the writing film is crystallized. The known method for this is a method in which the light irradiated is in an oblong shape extending along the laser advancing direction. When pseudo-over-write is carried out using two beams for writing new data while data already recorded is being erased, an oblong laser for erasing is positioned for irradiation ahead of a circular laser for writing.

On the other hand, in the disk utilizing the data writing film in which quick crystallization is possible, one laser beam focused into a circular shape is used. In the known method, change to a crystal state or an amorphous state is effected by changes between two levels of laser light power. That is, by irradiating on the writing film laser light having a power allowing writing film temperature to rise above the melting point, most portions thereof are changed to an amorphous state when cooled and, on the other hand, the portions which are irradiated by the laser light having a power for writing film temperature to rise above the crystallization temperature or to reach a temperature below the melting point are changed to a crystal state. For writing films of the phase transition type optical disks, the materials used include GeSbTe system, InSbTe system, InSe system, InTe system, AsTeGe system, TeOx-GeSn system, TeSeSn system, SbSeBi system, and BiSeGe system which are chalcogenide type materials. Film formation methods for all these materials include resistive heating vacuum vapor deposition, electron beam vacuum vapor deposition, and sputtering methods. The state of the writing film immediately after film formation is a kind of amorphous state and, for forming an amorphous state portion on the film upon writing, a formatting process is carried out for the entire writing film so as to be preset to a crystal state. The writing is achieved by forming an amorphous portion in the film of the crystal state.

Conventionally, in order to carry out a verifying operation to confirm whether the erasing operation and writing operation have been correctly effected and also whether the recorded state is correct, time corresponding to three disk rotations is required. Also, in the phase transition optical disk which permits overwriting, two disk rotations, one for an overwrite writing operation and the other for a verifying operation are required.

As above, when the data is rewritten, there is required a waiting time corresponding to at least two disk rotations and, for this reason, disk transfer speed is quite slow.

As a method for compensating for lowering of transfer speed caused by disk rotation waiting time during writing, verification carried out during writing, that is, simultaneous writing verifying operation is effective.

For example, in the write once read many type optical disk disclosed in Japanese Patent Application Kokai Publication No. Sho 55-89919, Japanese Patent Application Kokai Publication No. Sho 57-92438 and Japanese Patent Application Kokai Publication No. Sho 60-145537, a change in the amount of reflected light from the medium during writing is monitored so as to detect the written state of the data from reproduced wave shapes. Detection can be made because, by the writing, there occurs a shape change such as by formation of a hole in the write once and read many time medium, and the amount of the reflected light changes accordingly.

Also, in the magneto optical disk, it has been proposed, as disclosed in the Japanese Patent Application Kokai Publication No. Hei 3-207040, that the amount of the reflected light be monitored and, from change in the Kerr rotation angle of the optical beam caused by writing, the verifying signal is detected and verifying is effected at the same time as writing.

However, in the phase transition disk with which overwriting can easily be made, it is currently the case that no attempt has been made to effect the verifying operation during writing and no knowledge has been gained as to what structure of the disk is suited to verification during writing.

SUMMARY OF THE INVENTION

An object of the present invention is to provide an optical disk writing system and method for writing, which utilizes an optical data writing medium of a type in which there is a transition in reflectivity or optical phase in a writing film when light is irradiated thereon, and which enables writing operation and verification to be effected concurrently by a single beam spot.

Another object of the present invention is to provide a medium which is suited to simultaneous verifying operation during writing on the phase transition type optical disk. Also, the present invention aims to provide a writing/reading method which excels in simultaneous verification operation during writing. A further object of the invention is to provide a medium in which reflectivities in the melt state, crystal state and amorphous state are distinctly different, and a method which is suited to simultaneous verification during writing.

According to a first aspect of the invention, there is provided an optical disk writing system in which predetermined data is written on an optical data writing medium and the written data is verified, the system comprising:

a light spot irradiation means for forming a single light spot on the optical data writing medium;

a return light dose measurement means for measuring a dose of return light of the light spot from the optical data wiring medium; and an irradiation light timing detection means for detecting rise and fall timing of the light irradiated on the optical data writing medium, the written data being verified by measuring the return light dose at the rise and fall timings of the light irradiated on the optical data writing medium.

A method for writing data using the above optical disk includes the step of verifying the written data essentially simultaneously with writing of the data on the optical data writing medium, the verifying step including the step of detecting timing of the light irradiated on the optical data writing medium, the verifying being effected by measuring return light doses at rise and fall of the light irradiated on the optical data writing medium and comparing the doses thereof with predetermined reference values.

According to a second aspect of the invention, there is provided an optical data writing medium which uses a phase transition reversible between a crystal state and an amorphous state for writing/reading/erasing of data on a data writing film, and which comprises:

a transparent substrate;

a first protective film formed on the transparent substrate;

a phase transition type data writing film formed on the first protective film;

a second protective film formed on the phase transition type data writing film; and a reflection film formed on the second protective film, the first protective film having a thickness being set such that, of three reflectivities of the data writing film respectively in a crystal state, in an amorphous state, and in a melted state, the reflectivity in the crystal state and the reflectivity in the melted state are rendered different from each other, and the reflectivity in the amorphous state and the reflectivity in the melted state are rendered different from each other.

A method for verifying an optical data writing medium simultaneously with writing as explained above includes the step of detecting reflected light from the optical data writing medium when the data writing film formed on the optical data writing medium is changed to the melted state during the data writing by light irradiation.

BRIEF DESCRIPTION OF THE DRAWINGS

The above and other objects, features and advantages of the present invention will become apparent from the following description of preferred embodiments of the invention explained with reference to the accompanying drawings, in which.

PREFERRED EMBODIMENTS OF THE INVENTION

Figure 1:
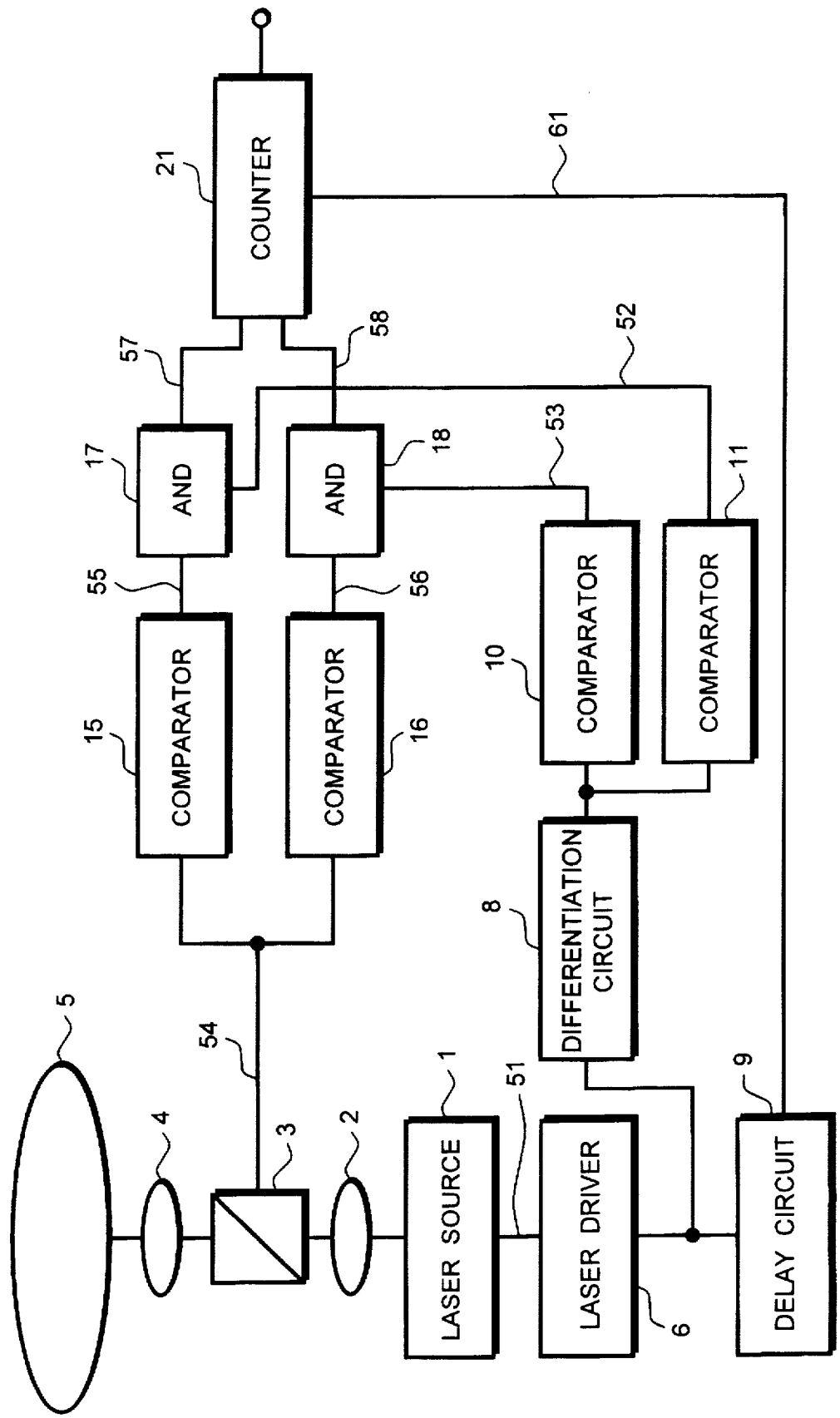
FIG. 1 is a diagram showing the overall structure of an embodiment of an optical writing system according to a first aspect of the invention.

Now, an optical disk writing system and method for writing, as an embodiment of the first aspect of the invention, are explained with reference to the drawings. FIG. 1 is referred to for describing a system and method embodied in the optical disk writing system and the method for writing according to this aspect of the invention. FIG. 1 diagrammatically shows the optical disk writing system.

The optical disk system shown in FIG. 1 is constituted by laser light source 1, lenses 2 and 4, beam splitter 3, phase transition optical disk 5, laser driver 6, differentiation circuit 8, delay circuit 9, comparators 10, 11, 15 and 16, AND circuits 17 and 18, and pulse count circuit 21.

The laser light source 1 comprises a light source system which emits a laser beam so as to produce a beam spot for writing/reading data on the phase transition optical disk 5. The laser light source 1 is driven by the laser driver 6.

Lenses 2 and 4 constitute a collector which focuses the laser light emitted from the laser light source 1 as a laser beam spot on the phase transition optical disk 5. The beam splitter 3 comprises a laser beam divider, which is disposed in the optical axis of the incident light and divides and extracts the return light from the optical disk. In this embodiment of the invention, the light emitted from the laser light source 1 is allowed to advance linearly, and the reflected light from the phase transition optical disk 5 is divided and reflected after being refracted 90°. The phase transition optical disk 5 is an optical disk for writing data by irradiation of the laser light. The writing of data is carried out by causing the states of the writing film of the optical disk to undergo transition in response to a local temperature rise due to light absorption of the laser light. The laser driver 6 is a circuit portion for driving the laser light source 1 and causing the laser light to be generated.

The differentiation circuit 8 is a circuit for extracting a 0/1 state transition point of an output signal from the laser driver 6 that drives the laser light source 1. The delay circuit 9 is a signal delay circuit portion for timings between the driving signal and the reflection signal. The comparators 10, 11, 15 and 16 comprise a comparison device for comparing the signal to be compared and the predetermined value. In this embodiment, by using these comparators, the transition states of the driving signal and the reflection signal are represented by pulse signals.

The AND circuits 17 and 18 constitute a logical product circuitry, which finds transition states of the driving signal of the laser driver 6, the laser light emitted from the laser light source 1, and the reflection light from the phase transition optical disk 5. The transition states make it possible to confirm, that is to verify, emission of laser light and execution of writing. The pulse count circuit 21 is a circuit portion for confirming whether the write confirmation signal and the read confirmation signal are correctly present. By this confirmation, reliability of the verification can be enhanced.

Figure 2:
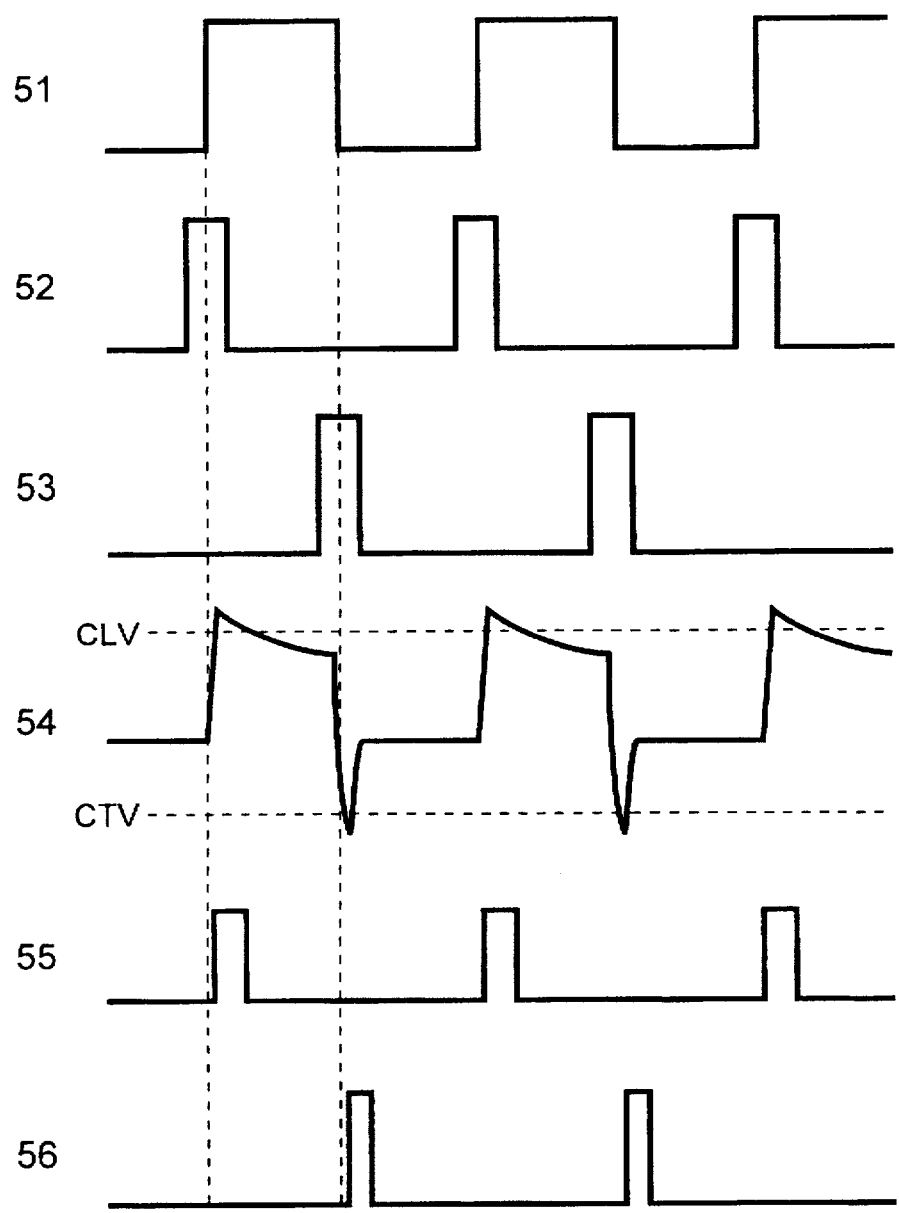
FIG. 2 is a timing chart showing various waveforms obtained during the verifying operation in the system shown in FIG. 1.

FIG. 2 shows, in timing charts, timings of verifying operations. The charts show, respectively, timings of the signals indicated in FIG. 1.

Waveform 51 shows a laser light source driving signal;

Waveform 52 shows a gate signal corresponding to a rise portion of the write signal;

Waveform 53 shows a gate signal corresponding to a fall portion of the write signal;

Waveform 54 shows an optical signal of the light returning from the phase transition optical disk during writing;

Waveform 55 shows a comparator signal in which the return light dose monitor signal IL outputted when the writing signal has risen is compared with the reference voltage CLV; and Waveform 56 shows a comparator signal in which the return light dose monitor signal IT outputted when the writing signal has fallen is compared with the reference voltage.

Further, by using the above mentioned signals, the output signal 57 of the AND circuit 17 is a logical product of the gate signal 52 with the waveform shown in FIG. 2 and the comparator signal 55 with the waveform shown in FIG. 2, and is represented by a symbol VL in the explanation given below. By this signal, it is possible to confirm that desired laser power has been irradiated on the writing film of the phase transition optical disk 5.

Also, the output signal 58 of the AND circuit 18 is a logical product of the gate signal 53 with the waveform shown in FIG. 2 and the comparator signal 56 with the waveform shown in FIG. 2, and is represented by a symbol VT in the explanation given below. By this signal, it is possible to confirm that the writing film of the phase transition optical disk 5 has melted and writing has correctly been accomplished.

Furthermore, where the writing signal 61 delayed by the delay circuit 9 and the logical product signals VL and VT take the logical product again, verification precision can be enhanced. In this embodiment, the delayed writing signal 61 is made a gate signal, and the number of the pulses of the output signals 57 of the AND circuit 17 and the output signals 58 of the AND circuit 18, which are generated in the gate, are counted. In this counting, when both of the two pulses, namely, one pulse of the signal VL and one pulse of the signal VT, are counted, it confirms that writing has been correctly been accomplished. Here, the writing signal is delayed because the time for the laser light rising and the time necessary for the writing film to melt are taken into account.

EXAMPLE 1

Figure 3:
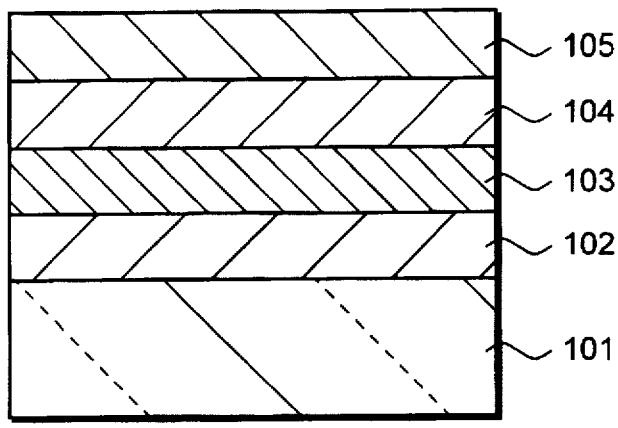
FIG. 3 is a diagrammatic structural sectional view of an optical disk used in Example 1 and Example 2 in the system shown in FIG. 1.

The phase transition optical disk 5 of this example is structured as shown in FIG. 3. The structure was obtained by depositing ZnS—SiO$_2$ 102 to a thickness of 150 nm, Ge$_2$Sb$_2$Te$_5$ 103 to a thickness of 20 nm, ZnS—SiO$_2$ 104 to 20 nm, and Al 105 to a thickness of 60 nm in this sequence,

7 by sputtering, on a polycarbonate substrate 101. On the optical disk, (2–7)-modulated random data was written by rotating this phase transition optical disk 5 at a linear speed of 7.5 m/s and setting the writing pulse width to 50 ns. The writing power Pw was set to between 14 and 16 mW, the erasing power Pe was set to 7 mW, and the reading power Pr was set to 1 mW.

Figure 4:
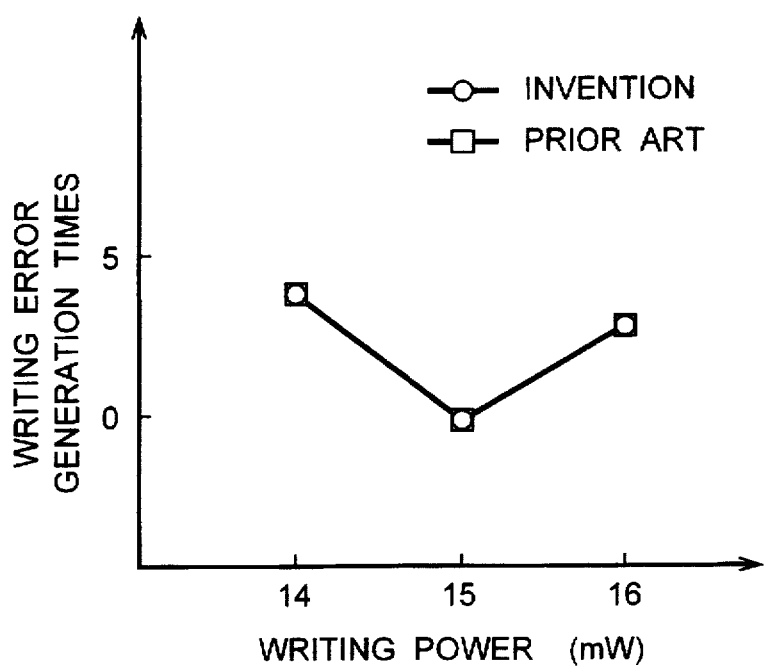
FIG. 4 is a graph showing a relationship between writing power and number of writing error generation times in the system shown in FIG. 1, compared with that in the prior art.

The reflectivities of the writing film were 25% when the film was in the crystal state, and 8% when in the amorphous state. The return light dose Ic from the phase transition optical disk 5, in a crystal state of the writing film, during reading was 1.5 V, and the return light dose IA from the phase transition optical disk 5 in an amorphous state was 0.48 V. The writing error signal generating times during writing, when CLV was set to (0.9×Ic×Pw)/Pr, while CTV was set to 0.5×(Ic+IA)×(PE)/Pr, are shown in FIG. 4. Shown in FIG. 4 are results of checking of writing errors by reading the written area after the writing as in the prior art. As is noted from FIG. 4, the detected number of writing error generation times in this example is in accord with that in the prior art example.

In the same way as above, verifying was carried out by varying the reference voltage CLV and the reference voltage CTV, and checking was made as to optimum values of reference voltages CLV and CTV. As a result, it was found that, with respect to reference voltage CLV, writing error generating times detected were in accord with those in the prior art example when the condition (0.7×Ic×Pw)/Pr<CLV<(Ic×Pw)/Pr was satisfied. Also, with respect to reference voltage CTV, writing error generating times detected were in accord with those in the prior art example when the condition (IA×PE)/Pr<CTV<(Ic×PE)/Pr was satisfied.

EXAMPLE 2

The phase transition optical disk 5 of this example employs a structure which is obtained by depositing ZnS—SiO$_2$ 102 to a thickness of 100 nm, Ge$_1$Sb$_2$Te$_4$ 103 to a thickness of 25 nm, ZnS—SiO$_2$ 104 to a thickness of 20 nm, and Al 105 to a thickness of 60 nm, in this sequence, by sputtering on a polycarbonate substrate 101. On this optical disk, (2–7)-modulated random data was written by rotating the disk at a linear speed of 7.5 m/s and setting the writing pulse width to 50 ns. Writing power Pw was set to between 16 and 18 mW, erasing power Pe was set to 8 mW, and reading power Pr was set to 1 mW.

The reflectivities of the writing film were 20% when the film was in the crystal state, and 6% when in the amorphous state. The return light dose Ic from the phase transition optical disk 5, in a crystal state of the writing film, during reading was 1.2 V, and the return light dose IA from the phase transition optical disk 5 in an amorphous state was 0.36 V.

Figure 5:
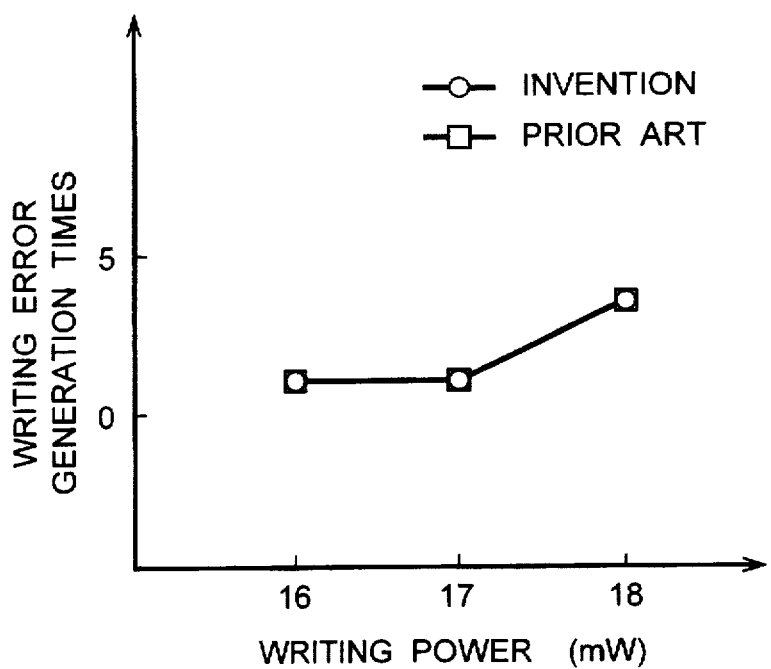
FIG. 5 is also a graph showing a relationship between the writing power and number of writing error generation times in the system shown in FIG. 1, compared with that in the prior art.

Writing error signal generating times with respect to writing power during writing, when the reference voltage CLV was set to (0.8×Ic×Pw)/Pr, while the reference voltage CTV was set to 0.4×(Ic+IA)×(Pe)/Pr are shown in FIG. 5. Shown in FIG. 5 are results of checking of writing errors by reading the written area after writing as in the prior art. As is noted from FIG. 5, the detected number of writing error generation times in this example is in accord with that in the prior art example.

In the same way as above, verifying was carried out by varying the reference voltage CLV and the reference voltage CTV, and checking was made as to optimum values of the reference voltages CLV and CTV. As a result, it was found that, with respect to the reference voltage CLV, writing error generating times detected were in accord with those in the prior art example when the condition (0.7×Ic×Pw)/Pr<CLV<(Ic×Pw)/Pr was satisfied. Also, with respect to the reference voltage CTV, writing error generating times detected were in accord with those in the prior art example when the condition (IA×PE)/Pr<CTV<(Ic×PE)/Pr was satisfied.

EXAMPLE 3

Figure 6:
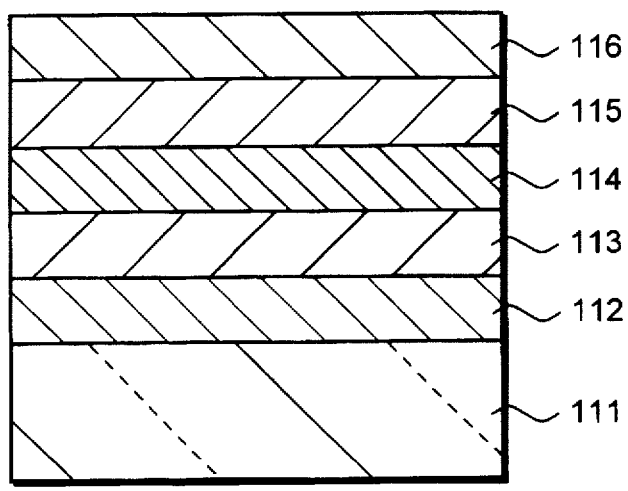
FIG. 6 is a diagrammatic structural sectional view of an optical disk used in Example 3 in the system shown in FIG. 1.

The phase transition optical disk 5 of this example is structured as shown in FIG. 6. The structure was obtained by depositing Au 112 to a thickness of 10 nm, ZnS—SiO$_2$ 113 to a thickness of 150 nm, Ge$_2$Sb$_2$Te$_5$ 114 to a thickness of 20 nm, ZnS—SiO$_2$ 115 to a thickness of 45 nm, and Al 116 to a thickness of 100 nm, in this sequence, by sputtering on a polycarbonate substrate 111. On this optical disk 5, (2–7)-modulated random data was written by rotating the disk at a linear speed of 7.5 m/s and setting the writing pulse width to 50 ns. Writing power Pw was set to between 18 and 20 mW, erasing power Pe was set to 9 mW, and reading power Pr was set to 1 mW.

In the medium of this configuration, reflectivity in the amorphous state is higher, and reflectivity when the writing film was in the crystal state was 10% and that when the writing film was in the amorphous state was 30%. The return light dose Ic from the phase transition optical disk 5, in a crystal state of the writing film, during reading was 0.6 V, and the return light dose IA from the phase transition optical disk 5 in the amorphous state was 1.8 V.

In the same way as above, verifying was carried out by varying the reference voltage CLV and reference voltage CTV, and checking was made as to the optimum values of the reference voltages CLV and CTV. As a result, it was found that, with respect to the reference voltage CLV, the writing error generating times detected were in accord with those in the prior art example when the condition (0.7×Ic×Pw)/Pr<CLV<(Ic×Pw)/Pr was satisfied. Also, with respect to the reference voltage CTV, the writing error generating times detected were in accord with those in the prior art example when the condition (Ic×PE)/Pr<CTV<(IA×PE)/Pr was satisfied.

As explained above, for carrying out verification, it is necessary to confirm whether the laser light of a predetermined intensity has in fact irradiated the writing film, or the writing film has in fact been melted. For confirming whether or not the light of the predetermined intensity has irradiated, the intensity monitor output IL of the return light from the optical disk at the rise of the writing signal may be checked. Also, for confirming whether or not the writing film has melted, the light dose monitor output IT of the return light from the optical disk at the fall of the writing signal may be checked. In the optical disk satisfying an Rc>Ra condition, the relationship among the reflectivities to be satisfied is Rc>Rm>Ra, and in the optical disk satisfying an Rc<Ra condition, the relationship among the reflectivities to be satisfied is Rc<Rm<Ra, wherein Rc is reflectivity of the writing film when it is in a crystal state, Ra is reflectivity when same is in an amorphous state, and Rm is reflectivity when same is in a melted state. The intensity of the light dose monitor output IT may be expressed by IT=PE×Pm, wherein erase power is represented by PE. Thus, by checking whether relationships Rc<(IT/PE)<Ra or Ra<(IT/PE)<Rc have been satisfied, it is possible to confirm whether the writing film has melted.

In each of the examples explained above, since verification can be carried out while writing is effected using a single beam spot, it is possible to reduce the time required for writing and also to simplify adjustment of the optical system which is otherwise complicated, thereby permitting manufacturing cost to be reduced.

Now, a preferred embodiment of the second aspect of the invention is explained with reference to the drawings.

Figure 7:
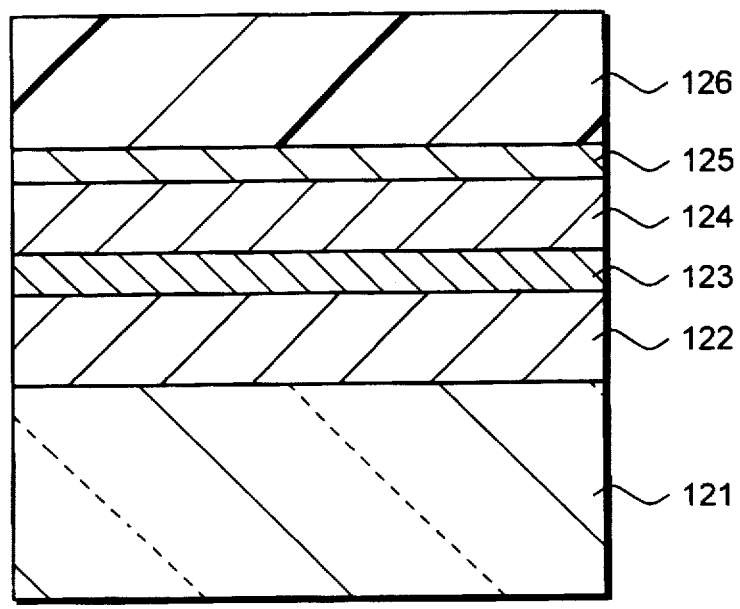
FIG. 7 is a diagrammatic structural sectional view of an optical disk used in Example 4 to Example 9 in an embodiment according a second aspect of the invention.

FIG. 7 shows in a sectional view structure of an optical data writing medium according to the invention. As shown therein, on a transparent substrate 121, there are deposited a first protective film 122, writing film 123, second protective film 124 and reflection film 125. On the reflection film 125, ultraviolet-setting resin 126 is coated for protective purposes.

The substrate 121 employs glass or plastic in a disk shape. The first protective film 122 and the second protective film 124 employ such dielectric materials as $SiO_2$, $Si_3N_4$, AlN, $TiO_2$, ZnS, and Zns—$SiO_2$. The writing film 123 employs GeSbTe, ZnSbTe, Inse, InTe, AsTeGe, TeOx—GeSn, TeSeSn, SbSeBi, BiSeGe, etc. of chalcogenide system. In the structure where transmittive high refraction materials are used as the reflection film 125, Si and Ge are used in particular. Also, when metal film is used as the reflection film 125, Al, Au or alloys of AlTi or alloys of AuPd, etc. can be used.

A feature of this second aspect of the invention resides in that, of three reflectivities of the data writing film, respectively, in a crystal state, amorphous state, and melted state, reflectivity in the crystal state and reflectivity in the melted state are different from each other, and reflectivity in the amorphous state and reflectivity in the melted state are different from each other.

Figure 8A:
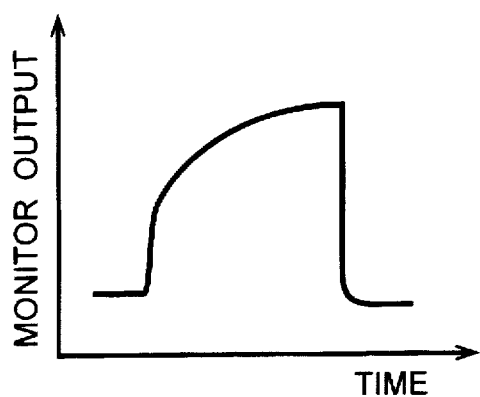
FIGS. 8A, 8B and 8C are diagrams for use in explaining a writing/reading method, particularly a verifying operation during writing, which uses an optical disk according to the invention.
Figure 8B:
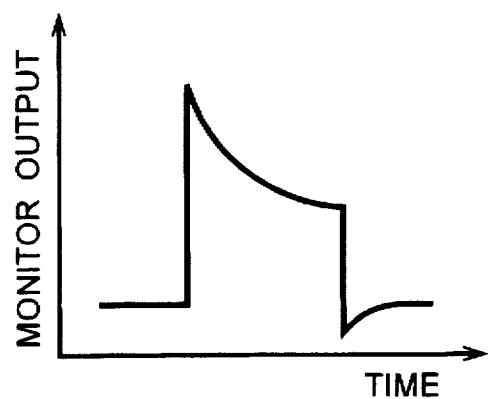
Figure 8C:
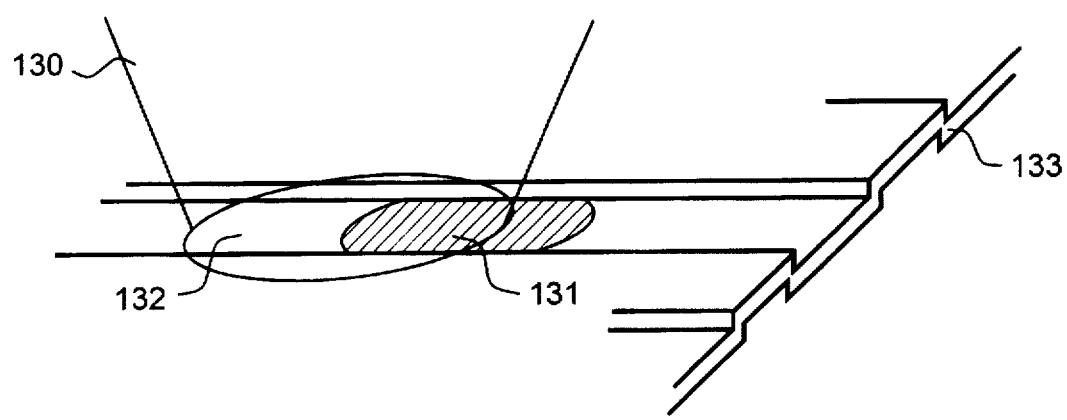

FIGS. 8A, 8B and 8C are for use in explaining a writing/reading method, particularly a verifying operation during writing, by using an optical data writing medium according to the invention. By irradiation of laser light 130 during writing, the writing film 133 is heated to above the melting point. The numeral 131 in FIG. 8C indicates a region where the writing film has been heated to above the melting point. The monitored signals of the reflection light doses then obtained are divided into two kinds in their states, as shown respectively in FIG. 8A and FIG. 8B. That is, the state in FIG. 8A is a state wherein reflectivity of the melt region 131 of the writing film is higher than that of region 132 that immediately precedes the melt region 131, and the state shown in FIG. 8B is a state wherein reflectivity of the melt region 131 is lower than that of region 132 that immediately precedes the melt region 131.

For verification operation during writing, that is, "simultaneous writing verification", it is important that the melt region 131 described above be accurately and correctly monitored. That is, during monitoring of the reflected light doses, it is necessary for reflectivity from the melt region and reflectivity from the region 132 immediately preceding the melt region 131 to be distinguishable with sufficient S/N ratio. For this reason, it is desired that the monitored signals be in the waveforms shown under FIGS. 8A and 8B.

Here, the reasons for the monitor signals resulting in the waveforms shown in FIGS. 8A and 8B are that, with writing power irradiation, light reflection dose becomes higher during the time period corresponding to the writing pulse irradiation, there is a time lag between the writing power irradiation start time and the melt start time, and the laser light 130 has a constant beam diameter.

Figure 9:
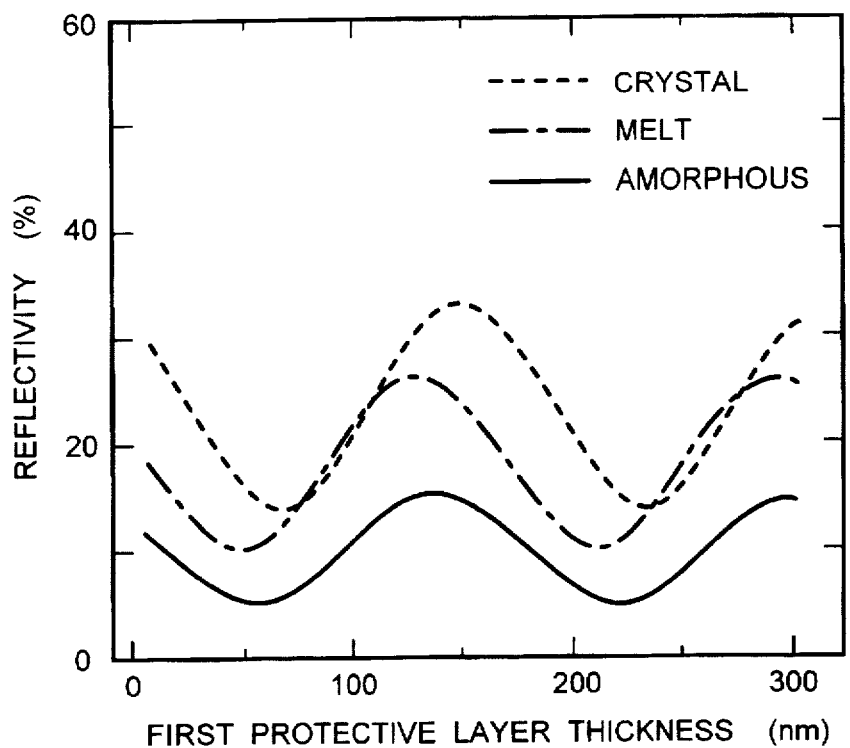
FIG. 9 is a graph showing the reflectivities obtained respectively for amorphous, melted and crystal states with respect to one structure of the recording medium according to the invention.

FIG. 9 is a graph showing the reflectivities obtained for an amorphous state, crystal state and melt state by one structure of the optical data writing medium according to the invention. The structure includes a transparent substrate 121, first protective film 122 formed on the transparent substrate 121, phase transition type data writing film 123 formed on the first protective film 122, second protective film 124 formed on the writing film 123, and reflection film 125 of high refraction dielectric formed on the second protective film 124. It also includes a layer of ultraviolet-setting resin 126. As the high refraction dielectric reflection film 125, Si is used in this structure. Wavelength is 690 nm.

Here, the transparent substrate employs polycarbonate, and the first protective film employs ZnS—$SiO_2$. In the layered structure, the thickness of the phase transition type data writing film of GeSbTe is 10 nm, that of the second protective film of ZnS—$SiO_2$ is 18 nm, and that of the reflective film of Si is 60 nm. Further, a ZnS—$SiO_2$ layer of 120 nm thickness as an interference layer and an ultraviolet-setting resin layer of 10 µm are formed on the resulting structure.

Where the thicknesses of the first protective film are between 70 and 130 nm and between 230 and 280 nm, the reflectivity of the crystal state and that of the melt state become essentially the same so that it is difficult to distinguish one from the other. However, in the remaining regions of the first protective film, the reflectivities, respectively, of the three states, namely, the crystal, amorphous and melt states, are distinctly different from one another, thereby making it possible to distinguish the melt state from the other states.

Figure 10:
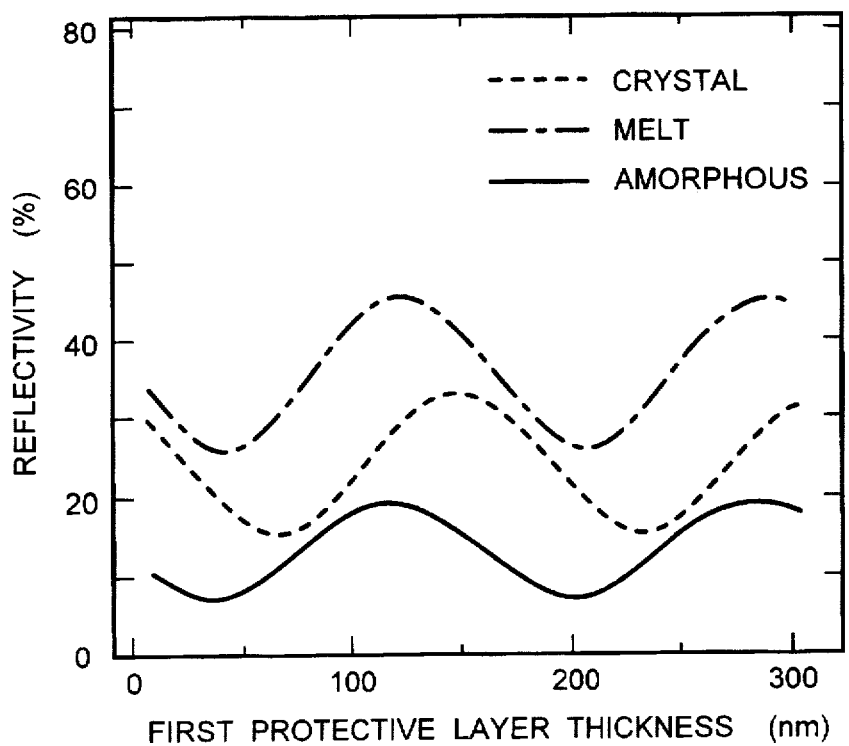
FIG. 10 is a graph showing the reflectivities obtained respectively for amorphous, melted and crystal states with respect to another structure of the recording medium according to the invention.

FIG. 10 is a graph showing the reflectivities obtained for an amorphous state, crystal state and melt state in another structure of the optical data writing medium according to the invention. The structure includes a transparent substrate 121, first protective film 122 formed on the transparent substrate 121, phase transition type data writing film 123 formed on the first protective film 122, second protective film 124 formed on the writing film, and reflection film 125 of metal formed on the second protective film 124. It also includes a layer of ultraviolet-setting resin 126. As the metal reflection film 125, Al is used in this structure. Wavelength is 690 nm.

Here, the transparent substrate employs polycarbonate, and the first protective film employs ZnS—$SiO_2$. In the layered structure, the thickness of the phase transition type data 8 writing film of GeSbTe is 12 nm, that of the second protective film of ZnS—$SiO_2$ is 20 nm, and that of the reflective film of Al is 60 nm. Further, an ultraviolet-setting resin layer of 10 µm is formed on the resulting structure.

As shown in FIG. 10, within the extent of the thicknesses of the first protective film, up to 300 nm, the reflectivities in the three states, that is, crystal, amorphous and melt states, are distinctly different from one another in the neighborhood of 130 nm, 210 nm, and 300 nm of the thicknesses of the first protective film, and this enables confirmation of the melt state.

Figure 11:
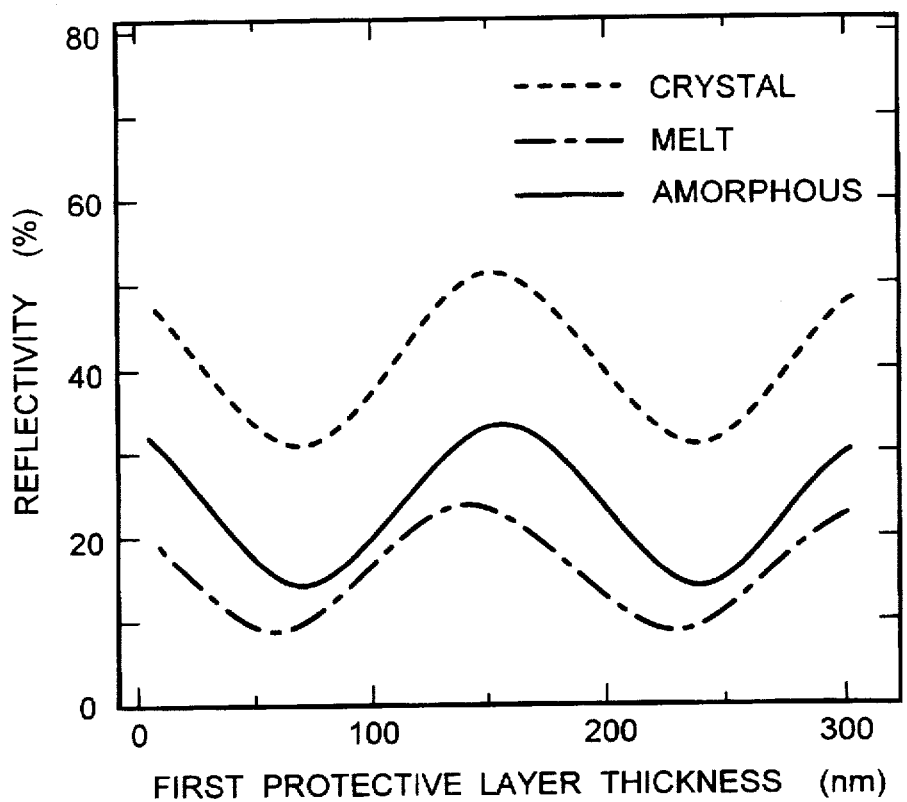
FIG. 11 is a graph showing the reflectivities obtained respectively for amorphous, melted and crystal states with respect to still another structure of the recording medium according to the invention.

FIG. 11 is a graph showing the reflectivities obtained for an amorphous state, crystal state and melt state with respect to still another structure of the optical data writing medium according to the invention. The structure includes a transparent substrate 121, first protective film 122 formed on the transparent substrate 121, phase transition type data writing film 123 formed on the first protective film 122, second protective film 124 formed on the writing film 123, and reflection film 125 of metal formed on the second protective film 124. It also includes a layer of ultraviolet-setting resin 126. As the metal reflection film 125, a thin film of Au is used in this structure. Wavelength is 690 nm.

Here, the transparent substrate employs polycarbonate, and the first protective film employs ZnS—$SiO_2$. In the layered structure, the thickness of the phase transition type data writing film of GeSbTe is 40 nm, that of the second protective film of ZnS—SiO$_2$ is 140 nm, and that of the reflective film of Au is 10 nm. Further, an ultraviolet-setting resin layer of 10 μm is formed on the resulting structure.

As shown in FIG. 11, the reflectivities in the amorphous and melt states are approximately the same and not distinguishable in the neighborhood of 100 nm and 260 nm of the thicknesses of the first protective film, but the reflectivities in the three states are significantly different from one another where the first protective film has thicknesses other than above thicknesses, thus enabling confirmation of the melt state.

In all of the above structures, it is the setting of the thicknesses of the medium that has made it possible to realize the desired three reflectivity characteristics, namely, the reflectivity characteristics under the crystal state, those under the amorphous state and those under the melt state of the data writing film.

For confirming the effects of this aspect of the invention, various tests have been conducted as explained below.

EXAMPLE 4

The optical data writing medium for this test is prepared as follows: The transparent substrate employs a polycarbonate substrate having preformed grooves and having a diameter of 130 mm and thickness of 1.2 mm. By sputtering, there are formed a ZnS—SiO$_2$ film of 150 nm thickness as a first protective film, a Ge$_2$Sb$_2$Te$_5$ film of 10 nm thickness as a writing film, a ZnS—SiO$_2$ film of 18 nm thickness as a second protective film, and an Si reflection film of 60 nm thickness as a reflection film. Also, a ZnS—SiO$_2$ film of 120 nm thickness is formed as an interference layer. Further, by spin coating, an ultraviolet-setting resin film of 10 μm thickness is deposited.

Then, by using an optical head mounted with a laser diode with a wavelength of 690 nm, overwrite is carried out and the reproduced waveforms during writing are monitored. The reproduced waveforms during writing have shown changes in reflectivity in the melt portion, thus enabling confirmation of the writing state as being in order.

COMPARISON EXAMPLE 1

The optical data writing medium for this comparison test is prepared as follows: The transparent substrate employs a polycarbonate substrate having preformed-grooves and having a diameter of 130 mm and thickness of 1.2 mm. By sputtering, there are formed a ZnS—SiO$_2$ film of 100 nm thickness as a first protective film, a Ge$_2$Sb$_2$Te$_5$ film of 10 nm thickness as a writing film, a ZnS—SiO$_2$ film of 18 nm thickness as a second protective film, and an Si film of 60 nm thickness as a reflection film. Also, a ZnS—SiO$_2$ film of 120 nm thickness is formed as an interference layer. Further, by spin coating, an ultraviolet-setting resin film of 10 μm thickness is deposited.

Then, by using an optical head mounted with a laser diode having a wavelength of 690 nm, overwrite is carried out and reproduced waveforms during writing are monitored. From these reproduced waveforms, it has not been possible to observe a distinction between the melt portion and the crystal portion, that is, it has not been possible to confirm the correctness of the writing state.

EXAMPLE 5

The optical data writing medium for this test is prepared as follows: The transparent substrate employs a polycarbonate substrate having preformed-grooves and having a diameter of 130 mm and thickness of 1.2 mm. By sputtering, there are formed a ZnS—SiO$_2$ film of 130 nm thickness as a first protective film, a Ge$_2$Sb$_2$Te$_5$ film of 12 nm thickness as a writing film, a ZnS—SiO$_2$ film of 20 nm thickness as a second protective film, and an Al film of 60 nm thickness as a reflection film. Also, by spin coating, an ultraviolet-setting resin film of 10 μm thickness is deposited.

Then, by using an optical head mounted with a laser diode having a wavelength of 690 nm, overwrite is carried out and reproduced waveforms during writing are monitored. The reproduced waveforms during writing have shown an increase in reflectivity in the melt portion as compared with that in the crystal portion, thus enabling confirmation of the writing state as being in order.

COMPARISON EXAMPLE 2

The optical data writing medium for this comparison test is prepared as follows: The transparent substrate employs a polycarbonate substrate having preformed-grooves and having a diameter of 130 mm and thickness of 1.2 mm. By sputtering, there are formed a ZnS—SiO$_2$ film of 180 nm thickness as a first protective film, a Ge$_2$Sb$_2$Te$_5$ film of 12 nm thickness as a writing film, a ZnS—SiO$_2$ film of 20 nm thickness as a second protective film, and an Al film of 60 nm thickness as a reflection film. Further, by spin coating, an ultraviolet-setting resin film of 10 μm thickness is deposited.

Then, by using an optical head mounted with a laser diode having a wavelength of 690 nm, overwrite is carried out and reproduced waveforms during writing are monitored. From these reproduced waveforms, it has not been possible to observe a distinction between the melt portion and crystal portion, that is, it has not been possible to confirm the correctness of the writing state.

EXAMPLE 6

The optical data writing medium for this test is prepared as follows: The transparent substrate employs a polycarbonate substrate having preformed-grooves and having a diameter of 130 mm and thickness of 1.2 mm. By sputtering, there are formed a ZnS—SiO$_2$ film of 180 nm thickness as a first protective film, a Ge$_2$Sb$_2$Te$_5$ film of 40 nm thickness as a writing film, a ZnS—SiO$_2$ film of 140 nm thickness as a second protective film, and an Au film of 10 nm thickness as a reflection film. Further, by spin coating, an ultraviolet-setting resin film of 10 μm thickness is deposited.

Then, by using an optical head mounted with a laser diode having a wavelength of 690 nm, overwrite is carried out and reproduced waveforms during writing are monitored. The reproduced waveforms during writing have shown a decrease in reflectivity in the melt portion as compared with that in the amorphous portion, thus enabling confirmation of the writing state as being in order.

COMPARISON EXAMPLE 3

The optical data writing medium for this comparison test is prepared as follows: The transparent substrate employs a polycarbonate substrate having preformed-grooves and having a diameter of 130 mm and thickness of 1.2 mm. By sputtering, there are formed a ZnS—SiO$_2$ film of 110 nm thickness as a first protective film, a Ge$_2$Sb$_2$Te$_5$ film of 40 nm thickness as a writing film, a ZnS—SiO$_2$ film of 140 nm thickness as a second protective film, and an Au film of 10 nm thickness as a reflection film. Further, by spin coating, an ultraviolet-setting resin film of 10 μm thickness is deposited.

Then, by using an optical head mounted with a laser diode having a wavelength of 690 nm, overwrite is carried out and reproduced waveforms during writing are monitored. From these reproduced waveforms, it has not been possible to observe a distinction between the melt portion and amorphous portion, that is, it has not been possible to confirm the correctness of the writing state.

EXAMPLE 7

The optical data writing medium for this test is prepared by using Ge for the reflection film instead of Si used in Example 4 with the remaining being the same as in Example 4.

Then, by using an optical head mounted with a laser diode having a wavelength of 690 nm, overwrite is carried out and reproduced waveforms during writing are monitored. The reproduced waveforms during writing have shown changes in reflectivity in the melt portion, thus enabling confirmation of the writing state as being in order.

EXAMPLE 8

The optical data writing medium for this test is prepared by using Al—Ti for the reflection film instead of Al used in Example 5 with the remaining being the same as in Example 5.

By using an optical head mounted with a laser diode having a wavelength of 690 nm, overwrite is carried out and reproduced waveforms during writing are monitored. The reproduced waveforms during writing have shown an increase in reflectivity in the melt portion as compared with that in the crystal portion, thus enabling confirmation of the writing state as being in order.

EXAMPLE 9

In order to confirm the effect of the writing/reading method according to the invention, by using the optical data writing medium described with reference to Example 4, the verifying operation during writing has been evaluated for confirming the effect of the writing/reading method according to the invention.

Figure 12:
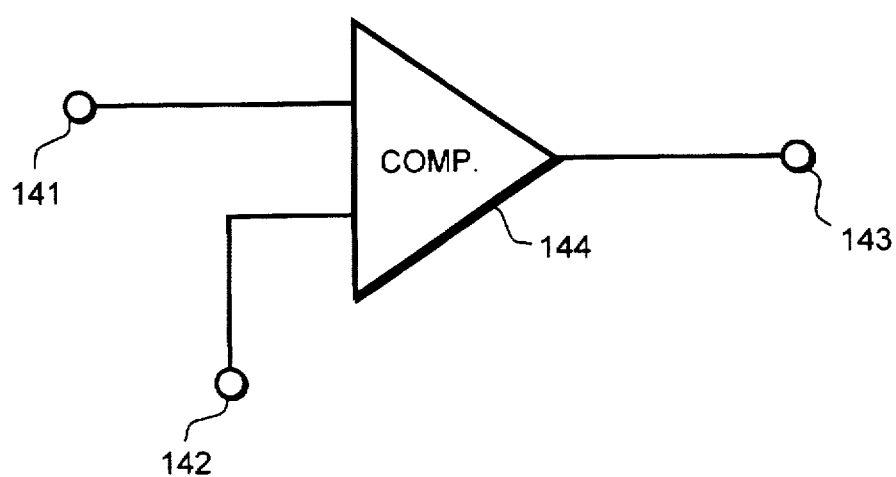
FIG. 12 is circuit diagram showing a circuit for the judgment of verifying operations.

For judgment of the verifying operation, a judgment circuit illustrated in FIG. 12 has been used. Here, comparator 144 receives reading signal 141 during writing and comparator level 142, and it outputs comparator output signal 143. In the arrangement shown in FIG. 12, the comparator input level with respect to the reading signal during the writing has been set as shown by 142 in FIG. 13.

Figure 13:
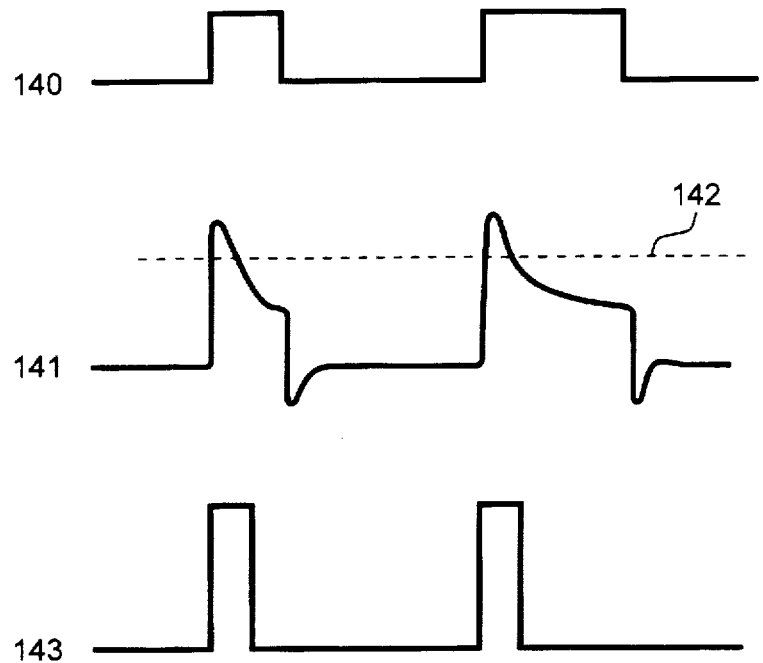
FIG. 13 is a timing chart showing various waveforms obtained during the verifying operation according to the invention.

FIG. 13 shows the waveforms obtained when writing is made under the crystal state, waveform 140 showing the writing signal, waveform 141 showing the reading signal during writing, and waveform 142 showing verifying comparator level. In this example, since reflectivity in the melt state is lower than that in the crystal state, the comparator output pulses are as shown by waveform 143. Thus, the crystal state and melt state can be distinguished from each other whereby a desired verifying output can be obtained.

Figure 14:
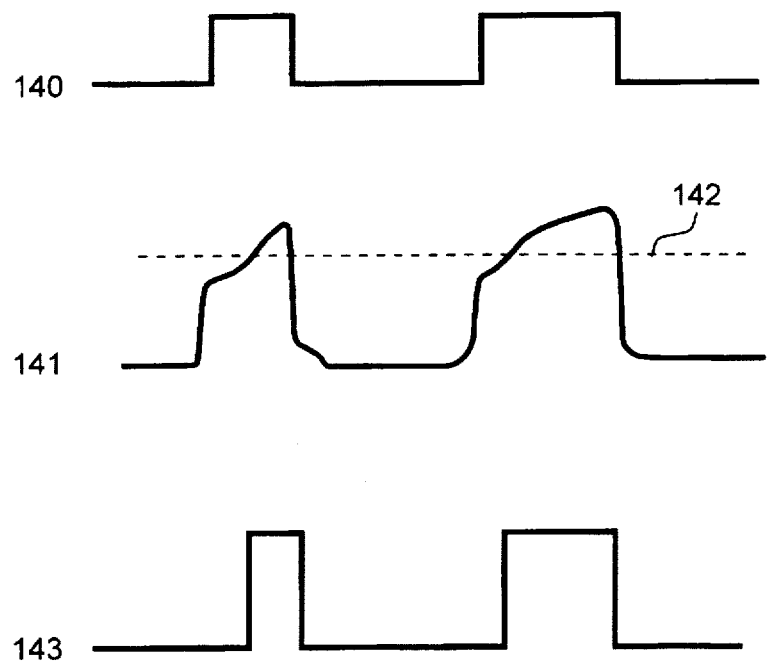
FIG. 14 is a timing chart showing various waveforms obtained during the verifying operation according to the invention.

FIG. 14 shows the waveforms obtained when writing is made under the amorphous state, waveform 140 showing the writing signal, waveform 141 showing the reading signal during writing, and waveform 142 showing the verifying comparator level. In this example, since reflectivity in the melt state is lower than that in the crystal state, the comparator output pulses are as shown by waveform 143. Thus, the crystal state and melt state can be distinguished from each other whereby a desired verifying output can be obtained.

As explained above, the invention provides a structure of the medium which is suited for simultaneous writing/verifying operations of the phase transition type disk, and it also provides a writing/reading method which is featured in simultaneous writing/verifying operations. According to the invention, since it is possible to realize a structure of the medium in which reflectivities in the melt, crystal and amorphous states are distinctly different from one another, and simultaneous writing/verifying procedures which are suited for such medium, a great advantage is engendered by the invention in that data rewriting operations can be effected at high speed. Another great advantage is that an overwrite operation can be completed within one disk rotation.

While the invention has been described with reference to its preferred embodiments, it is to be understood that the words which have been used are words of description rather than limitation and that changes within the purview of the appended claims may be made without departing from the true scope of the invention as defined by the claims.

What is claimed is:

1. An optical disk writing system in which predetermined data is written on an optical data writing medium and the written data is verified, said system comprising:
   a light spot irradiation means for forming a single light spot on said optical data writing medium, said single light spot being used for writing, reading and verifying operations;
   a return light dose measurement means for measuring a dose of return light of said light spot from said optical data writing medium; and
   an irradiation light timing detection means for detecting a rise and a fall timing of the light irradiated on said optical data writing medium,
   said written data being verified by measuring the return light dose at said rise and fall timings of said light irradiated on said optical data writing medium.

2. The optical disk writing system according to claim 1, wherein said optical data writing medium comprises a phase transition optical disk.

3. The optical disk writing system according to claim 1, wherein said return light dose measurement means includes two comparators with which the return light is measured by making comparison between doses of the return light at the rise and the fall of the irradiated light with predetermined reference values.

4. The optical disk writing system according to claim 1, wherein said light spot irradiation means includes a laser light emitting means, and said irradiation light timing detection means includes a differentiation means for detecting the irradiation light timing by differentiating a driving signal to said laser light emitting means at the rise and the fall of the irradiated light.

5. A method for writing data on an optical disk, comprising the steps of:
   forming a single light spot and irradiating said single light spot on an optical data writing medium, said single light spot being used for writing, reading and verifying operations;
   writing a predetermined data on said optical data writing medium using said single light spot;
   measuring a light dose of return light of said single light spot from said optical data writing medium; and
   verifying the written data essentially simultaneously with the writing of said predetermined data on said optical data writing medium, the verifying step including a step of detecting a rise and a fall timing of the light irradiated on said optical data writing medium, the verifying being effected by measuring return light doses at said rise and fall timings of said light irradiated on said optical data writing medium and comparing the doses thereof with predetermined reference values.

6. The method of writing data on an optical disk according to claim 5, wherein the step of measuring a light dose is carried out by measuring the return light and making comparison between doses of the return light at the rise and the fall of the irradiated light with predetermined reference values.

7. The method of writing data on an optical disk according to claim 6, in which a first reference voltage CLV at a rise time of said predetermined value satisfies the following relationship:

(0.7×Ic×Pw)Pr<CLV<(Ic×Pw)/Pr, wherein

Pw is writing laser power;

Pr is a reading power; and

Ic is a return light dose monitor signal outputted upon reading when the writing film is in a crystal state.

8. The method of writing data on an optical disk according to claim 6, wherein a second reference voltage CTV at a fall time of said predetermined value satisfies the following relationship:

(IA×PE)/Pr<CTV<(Ic×PE)/Pr, wherein

PE is an erasing laser power;

Pr is a reading power;

Ic is a return light dose monitor signal outputted upon reading when the writing film is in a crystal state; and Ia is a return light does signal outputted upon reading when the writing film is in an amorphous state.

9. The method of writing data on an optical disk according to claim 6, wherein a second reference voltage CTV at a fall time of said predetermined value satisfies the following relationship:

(Ic×PE)/Pr<CTV<(IA×PE)/Pr, wherein

PE is an erasing laser power;

Pr is a reading power;

Ic is a return light dose monitor signal outputted upon reading when the writing film is in a crystal state; and IA is a return light dose signal outputted upon reading when the writing film is in an amorphous state.

10. An optical disk writing system in which predetermined data is written on an optical data writing medium and the written data is verified, said system comprising:

a light spot irradiation means for forming a single light spot on said optical data writing medium;

a return light dose measurement means for measuring a dose of return light of said light spot from said optical data writing medium; and an irradiation light timing detection means for detecting a rise and a fall timing of the light irradiated on said optical data writing medium, said written data being verified by measuring the return light dose at said rise and fall timings of said light irradiated on said optical data writing medium;

wherein said light spot irradiation means includes a laser light emitting means, and said irradiation light timing detection means includes a differentiation means for detecting the irradiation light timing by differentiating a driving signal to said laser light emitting means at the rise and the fall of the irradiated light.

11. The optical disk writing system according to claim 10, wherein said optical data writing medium comprises a phase transition optical disk.

12. The optical disk writing system according to claim 10, wherein said return light dose measurement means includes two comparators with which the return light is measured by making comparison between doses of the return light at the rise and the fall of the irradiated light with predetermined reference values.

13. A method for writing data on an optical disk, comprising the steps of:

forming a single light spot and irradiating said single light spot on an optical data writing medium;

writing a predetermined data on said optical data writing medium using said single light spot;

measuring a light dose of return light of said single light spot from said optical data writing medium; and verifying the written data essentially simultaneously with the writing of said predetermined data on said optical data writing medium, the verifying step including a step of detecting a rise and a fall timing of the light irradiated on said optical data writing medium, the verifying being effected by measuring return light doses at said rise and fall timings of said light irradiated on said optical data writing medium and comparing the doses thereof with predetermined reference values;

wherein the step of measuring a light dose is carried out by measuring the return light and making comparison between doses of the return light at the rise and fall of the irradiated light with predetermined reference values, and wherein a first reference voltage CLV at a rise time of said predetermined value satisfies the following relationship:

(0.7×Ic×Pw)Pr<CLV<(Ic×Pw)/Pr, wherein

Pw is a writing laser power;

Pr is a reading power; and

Ic is a return light dose monitor signal outputted upon reading when the writing film is in crystal state.

14. A method for writing data on an optical disk, comprising the steps of:

forming a single light spot and irradiating said single light spot on an optical data writing medium;

writing a predetermined data on said optical data writing medium using said single light spot;

measuring a light dose of return light of said single light spot from said optical data writing medium; and verifying the written data essentially simultaneously with the writing of said predetermined data on said optical data writing medium, the verifying step including a step of detecting a rise and a fall timing of the light irradiated on said optical data writing medium, the verifying being effected by measuring return light doses at said rise and fall timings of said light irradiated on said optical data writing medium and comparing the doses thereof with predetermined reference values;

wherein the step of measuring a light dose is carried out by measuring the return light and making comparison between the doses of the return light at the rise and fall of the irradiated light with predetermined reference values, and a second reference voltage CTV at a fall time of said predetermined value satisfies the following relationship:

(IA×PE)/Pr<CTV<(Ic×PE)/Pr, wherein

PE is an erasing laser power;

Pr is a reading power;

Ic is a return light dose monitor signal outputted upon reading when the writing film is in a crystal state; and IA is a return light dose signal outputted upon reading when the writing film is in an amorphous state.

15. A method for writing data on an optical disk, comprising the steps of:

forming a single light spot and irradiating it on an optical data writing medium;

writing a predetermined data on said optical data writing medium using said single light spot;

measuring a light does of return light of said single light spot from said optical data writing medium; and verifying the written data essentially simultaneously with the writing of said predetermined data on said optical data writing medium, the verifying step including a step of detecting a rise and a fall timing of the light irradiated on said optical data writing medium, the verifying being effected by measuring return light doses at said rise and fall timings of said light irradiated on said optical data writing medium and comparing the doses thereof with predetermined reference values;

wherein the step of measuring a light dose is carried out by measuring the return light and making comparison between doses of the return light at the rise and the fall of the irradiated light with predetermined reference values, and a second reference voltage CTV at a fall time of said predetermined value satisfies the following relationship:

$(Ic \times PE)/Pr < CTV < (IA \times PE)/Pr$, wherein

PE is an erasing laser power;

Pr is a reading power;

Ic is a return light does monitor signal outputted upon reading when the writing film is in a crystal state; and IA is a return light dose signal outputted upon reading when the writing film is in an amorphous state.

\* \* \* \* \*